US008825629B2

(12) United States Patent
Lawande et al.

(10) Patent No.: US 8,825,629 B2
(45) Date of Patent: Sep. 2, 2014

(54) METHOD FOR INDEX TUNING OF A SQL STATEMENT, AND INDEX MERGING FOR A MULTI-STATEMENT SQL WORKLOAD, USING A COST-BASED RELATIONAL QUERY OPTIMIZER

(75) Inventors: Shilpa Lawande, Nashua, NH (US); Mohamed Ziauddin, Pleasanton, CA (US); Gregory Scott Smith, Merrimack, NH (US)

(73) Assignee: Oracle International Corporation, Redwood Shores, CA (US)

( * ) Notice: Subject to any disclaimer, the term of this patent is extended or adjusted under 35 U.S.C. 154(b) by 526 days.

(21) Appl. No.: 10/936,469

(22) Filed: Sep. 7, 2004

(65) Prior Publication Data

US 2005/0187917 A1     Aug. 25, 2005

Related U.S. Application Data

(60) Provisional application No. 60/500,490, filed on Sep. 6, 2003.

(51) Int. Cl.
*G06F 7/00* (2006.01)
*G06F 17/30* (2006.01)

(52) U.S. Cl.
USPC ......................................................... 707/713

(58) Field of Classification Search
USPC ....................................................... 707/1–10
See application file for complete search history.

(56) References Cited

U.S. PATENT DOCUMENTS

| | | |
|---|---|---|
| 5,140,685 A | 8/1992 | Sipple et al. |
| 5,260,697 A | 11/1993 | Barrett et al. |
| 5,398,183 A | 3/1995 | Elliott |
| 5,408,653 A | 4/1995 | Josten et al. |
| 5,481,712 A | 1/1996 | Silver et al. |
| 5,504,917 A | 4/1996 | Austin |
| 5,544,355 A | 8/1996 | Chaudhuri et al. |
| 5,577,240 A | 11/1996 | Demers et al. |
| 5,634,134 A | 5/1997 | Kumai et al. |
| 5,724,569 A | 3/1998 | Andres |
| 5,737,601 A | 4/1998 | Jain et al. |
| 5,761,660 A | 6/1998 | Josten et al. |
| 5,765,159 A | 6/1998 | Srinivasan |
| 5,781,912 A | 7/1998 | Demers et al. |
| 5,794,227 A | 8/1998 | Brown |
| 5,794,228 A * | 8/1998 | French et al. .......................... 1/1 |
| 5,794,229 A | 8/1998 | French et al. |

(Continued)

OTHER PUBLICATIONS

Aboulnaga, A. et al. "Self-tuning Histograms: Building Histograms Without Looking at Data", Proceedings of the 1999 ACM SIGMOD International Conference on Management of Data, SIGMOD'99, Philadelphia, PA, 1999, pp. 181-192.

(Continued)

*Primary Examiner* — Mariela Reyes
*Assistant Examiner* — Michael Pham
(74) *Attorney, Agent, or Firm* — Vista IP Law Group, LLP

(57) ABSTRACT

An access structure analysis method is interspersed with the query optimization process. The method can determine the ideal combination of access structures, including both materialized views and indexes, for a given database workload. The interspersed structure analysis method can include advanced transformations like view merging, star transformation, bitmap access plans, query rewrite using materialized views, for example. The method may be performed using the query optimizer's rules as heuristics to guide the index candidate generation process.

27 Claims, 4 Drawing Sheets

(56) References Cited

U.S. PATENT DOCUMENTS

| | | | |
|---|---|---|---|
| 5,806,076 A | 9/1998 | Ngai et al. | |
| 5,860,069 A | 1/1999 | Wright | |
| 5,870,760 A | 2/1999 | Demers et al. | |
| 5,870,761 A | 2/1999 | Demers et al. | |
| 5,940,826 A | 8/1999 | Heideman et al. | |
| 5,963,933 A | 10/1999 | Cheng et al. | |
| 5,963,934 A | 10/1999 | Cochrane et al. | |
| 5,991,765 A | 11/1999 | Vethe | |
| 6,052,694 A | 4/2000 | Bromberg | |
| 6,122,640 A | 9/2000 | Pereira | |
| 6,195,653 B1 | 2/2001 | Bleizeffer et al. | |
| 6,212,514 B1 | 4/2001 | Eberhard et al. | |
| 6,266,658 B1* | 7/2001 | Adya et al. | 1/1 |
| 6,275,818 B1 | 8/2001 | Subramanian et al. | |
| 6,321,218 B1 | 11/2001 | Guay et al. | |
| 6,330,552 B1 | 12/2001 | Farrar et al. | |
| 6,334,128 B1* | 12/2001 | Norcott et al. | 1/1 |
| 6,349,310 B1 | 2/2002 | Klein et al. | |
| 6,353,818 B1 | 3/2002 | Carino, Jr. | |
| 6,356,889 B1* | 3/2002 | Lohman et al. | 707/2 |
| 6,366,901 B1 | 4/2002 | Ellis | |
| 6,366,903 B1* | 4/2002 | Agrawal et al. | 707/2 |
| 6,374,257 B1 | 4/2002 | Guay et al. | |
| 6,397,207 B1 | 5/2002 | Bleizeffer et al. | |
| 6,397,227 B1 | 5/2002 | Klein et al. | |
| 6,434,545 B1 | 8/2002 | MacLeod et al. | |
| 6,434,568 B1 | 8/2002 | Bowman-Amuah | |
| 6,442,748 B1 | 8/2002 | Bowman-Amuah | |
| 6,460,027 B1 | 10/2002 | Cochrane et al. | |
| 6,460,043 B1 | 10/2002 | Tabbara et al. | |
| 6,493,701 B2 | 12/2002 | Ponnekanti | |
| 6,496,819 B1* | 12/2002 | Bello et al. | 1/1 |
| 6,496,850 B1 | 12/2002 | Bowman-Amuah | |
| 6,513,029 B1 | 1/2003 | Agrawal et al. | |
| 6,529,901 B1 | 3/2003 | Chaudhuri et al. | |
| 6,560,606 B1 | 5/2003 | Young | |
| 6,571,233 B2 | 5/2003 | Beavin et al. | |
| 6,594,653 B2 | 7/2003 | Colby et al. | |
| 6,598,038 B1* | 7/2003 | Guay et al. | 707/2 |
| 6,615,223 B1 | 9/2003 | Shih et al. | |
| 6,701,345 B1 | 3/2004 | Carley et al. | |
| 6,714,943 B1 | 3/2004 | Ganesh et al. | |
| 6,721,724 B1 | 4/2004 | Galindo-Legaria et al. | |
| 6,728,719 B1 | 4/2004 | Ganesh et al. | |
| 6,728,720 B1* | 4/2004 | Lenzie | 707/101 |
| 6,744,449 B2 | 6/2004 | MacLeod et al. | |
| 6,763,353 B2 | 7/2004 | Li et al. | |
| 6,804,672 B1 | 10/2004 | Klein et al. | |
| 6,816,874 B1 | 11/2004 | Cotner et al. | |
| 6,839,713 B1 | 1/2005 | Shi et al. | |
| 6,850,925 B2 | 2/2005 | Chaudhuri et al. | |
| 6,865,567 B1 | 3/2005 | Oommen et al. | |
| 6,910,109 B2 | 6/2005 | Holman et al. | |
| 6,912,547 B2 | 6/2005 | Chaudhuri et al. | |
| 6,915,290 B2 | 7/2005 | Bestgen et al. | |
| 6,931,389 B1 | 8/2005 | Bleizeffer et al. | |
| 6,934,701 B1* | 8/2005 | Hall, Jr. | 707/2 |
| 6,947,927 B2 | 9/2005 | Chaudhuri et al. | |
| 6,961,931 B2 | 11/2005 | Fischer | |
| 6,999,958 B2 | 2/2006 | Carlson et al. | |
| 7,007,013 B2 | 2/2006 | Davis et al. | |
| 7,031,958 B2 | 4/2006 | Santosuosso | |
| 7,047,231 B2* | 5/2006 | Grasshoff et al. | 707/2 |
| 7,058,622 B1 | 6/2006 | Tedesco | |
| 7,080,062 B1 | 7/2006 | Leung et al. | |
| 7,139,749 B2 | 11/2006 | Bossman et al. | |
| 7,146,363 B2 | 12/2006 | Waas et al. | |
| 7,155,426 B2 | 12/2006 | Al-Azzawe | |
| 7,155,459 B2 | 12/2006 | Chaudhuri et al. | |
| 7,272,589 B1* | 9/2007 | Guay et al. | 707/2 |
| 7,302,422 B2* | 11/2007 | Bossman et al. | 707/2 |
| 7,353,219 B2 | 4/2008 | Markl et al. | |
| 2002/0073086 A1 | 6/2002 | Thompson et al. | |
| 2002/0120617 A1* | 8/2002 | Yoshiyama et al. | 707/3 |
| 2002/0198867 A1 | 12/2002 | Lohman et al. | |
| 2003/0018618 A1 | 1/2003 | Bestgen et al. | |
| 2003/0065648 A1 | 4/2003 | Driesch et al. | |
| 2003/0088541 A1* | 5/2003 | Zilio et al. | 707/1 |
| 2003/0093408 A1* | 5/2003 | Brown et al. | 707/2 |
| 2003/0110153 A1 | 6/2003 | Shee | |
| 2003/0115183 A1 | 6/2003 | Abdo et al. | |
| 2003/0126143 A1 | 7/2003 | Roussopoulos et al. | |
| 2003/0130985 A1 | 7/2003 | Driesen et al. | |
| 2003/0135478 A1 | 7/2003 | Marshall et al. | |
| 2003/0154216 A1 | 8/2003 | Arnold et al. | |
| 2003/0177137 A1 | 9/2003 | MacLeod et al. | |
| 2003/0182276 A1 | 9/2003 | Bossman et al. | |
| 2003/0187831 A1 | 10/2003 | Bestgen et al. | |
| 2003/0200204 A1 | 10/2003 | Limoges et al. | |
| 2003/0200537 A1 | 10/2003 | Barsness et al. | |
| 2003/0229621 A1 | 12/2003 | Carlson et al. | |
| 2003/0229639 A1 | 12/2003 | Carlson et al. | |
| 2004/0002957 A1 | 1/2004 | Chaudhuri et al. | |
| 2004/0003004 A1* | 1/2004 | Chaudhuri et al. | 707/200 |
| 2004/0019587 A1 | 1/2004 | Fuh et al. | |
| 2004/0034643 A1 | 2/2004 | Bonner et al. | |
| 2004/0054683 A1* | 3/2004 | Nishizawa et al. | 707/102 |
| 2004/0181521 A1 | 9/2004 | Simmen et al. | |
| 2004/0210563 A1* | 10/2004 | Zait et al. | 707/3 |
| 2004/0215626 A1 | 10/2004 | Colossi et al. | |
| 2005/0033734 A1 | 2/2005 | Chess et al. | |
| 2005/0097078 A1 | 5/2005 | Lohman et al. | |
| 2005/0097091 A1 | 5/2005 | Ramacher et al. | |
| 2005/0102305 A1 | 5/2005 | Chaudhuri et al. | |
| 2005/0119999 A1 | 6/2005 | Zait et al. | |
| 2005/0120000 A1 | 6/2005 | Ziauddin et al. | |
| 2005/0120001 A1 | 6/2005 | Yagoub et al. | |
| 2005/0125393 A1 | 6/2005 | Yagoub et al. | |
| 2005/0125398 A1 | 6/2005 | Das et al. | |
| 2005/0125427 A1 | 6/2005 | Dageville et al. | |
| 2005/0125452 A1 | 6/2005 | Ziauddin et al. | |
| 2005/0138015 A1 | 6/2005 | Dageville et al. | |
| 2005/0177557 A1 | 8/2005 | Ziauddin et al. | |
| 2005/0187917 A1 | 8/2005 | Lawande et al. | |
| 2005/0251523 A1 | 11/2005 | Rajamani et al. | |
| 2006/0004828 A1 | 1/2006 | Rajamani et al. | |
| 2006/0167883 A1 | 7/2006 | Boukobza | |
| 2007/0038618 A1* | 2/2007 | Kosciusko et al. | 707/4 |

OTHER PUBLICATIONS

Almeida, et al., "Panasync: Dependency tracking among file copies", Proceedings of the 9th Workshop on ACM SIGOPS European Workshop: Beyond the PC: New Challenges for the Operating System, Kolding, Denmark, pp. 7-12.

Baldoni, et al., "A Communication-Induced Checkpointing Protocol that Ensures Rollback-Dependency Trackability", 27th Annual International Symposium on Fault-Tolerant Computing, FTCS-27, IEEE, 1997, pp. 68-77.

Baldoni, et al., "Rollback-Dependency Trackability: Visible Characterizations", Proceedings of the 18th Annual ACM Symposium on Principles of Distributed Computing, Atlanta, GA, 1999, pp. 33-42.

Damani, et al, "Optimistic Distributed Simulation Based on Transitive Dependency Tracking", Proceedings of the 11th Workshop on Parellel and Distributed Simulation, IEEE, 1997, pp. 90-97.

Elnozahy, "On the Relevance of Communication Costs of Rollback-Recovery Protocols", Proceedings of the 14th Annual ACM Symposium on Principles of Distributed Computing, Ottawa, Ontario, Canada, 1995, pp. 74-79.

Garcia, et al., "On the Minimal Characterization of the Rollback-Dependency Trackability Property", 21st International Conference on Distributed Computing Systems, IEEE, Apr. 16-19, 2001, pp. 342-349.

Graefe, G. "Dynamic Query Evaluation Plans: Some Course Corrections?", Bulletin of the IEEE Computer Society Technical Committee on Data Engineering, Jun. 2000, vol. 23, No. 2, pp. 3-6.

Hellerstein, J.M. et al. "Adaptive Query Processing: Technology in Evolution", Bulletin of the IEEE Computer Society Technical Committee on Data Engineering, Jun. 2000, vol. 23, No. 2, pp. 7-18.

Kabra, N. et al. "Efficient Mid-Query Re-Optimization of Sub-Optimal Query Execution Plans", Proceedings of the 1998 ACM

(56) References Cited

OTHER PUBLICATIONS

SIGMOD International Conference on Management of Data, SIGMOD'98, Seattle, WA, 1998, pp. 106-117.
Louboutin, et al., "Comprehensive Distributed Garbage Collection by Tracking Causal Dependencies of Relevant Mutator Events", Proceedings of the 17th International Conference on Distributed Computing Systems, IEEE, May 27-30, 1997, pp. 516-525.
Perry, "Consumer Electronics", IEEE Spectrum, Jan. 1997, vol. 34, No. 1, pp. 43-48.
Sadri, "Integrity Constraints in the Information Source Tracking Method", IEEE Transactions on Knowledge and Data, Feb. 1995, vol. 7, Issue 1, pp. 106-119.
Sreenivas, et al., "Independent Global Snapshots in Large Distributed Systems", Proceedings of the 4th International Conference on High Performance Computing, IEEE, Dec. 18-21, 1997, pp. 462-467.
Avnur, R. et al. "Eddies: Continuously Adaptive Query Processing" Proceedings of the 2000 ACM SIGMOD International Conference on Management of Data (SIGMOD '00), Dallas, TX, May 15-18, 2000, pp. 261-272.
Blakeley, J.A. et al. "Experiences Building the Open OODB Query Optimizer" Proceedings of the 1993 ACM SIGMOD International Conference on Management of Data (SIGMOD '93), Washington, DC, May 25-28, 1993, pp. 287-296.
Bruno, N. et al. "STHoles: A Multidimensional Workload-Aware Histogram" Proceedings of the 2001 ACM SIGMOD International Conference on Management of Data (SIGMOD '01), Santa Barbara, CA, May 21-24, 2001, pp. 211-222.
Bruno, N. et al. "Exploiting Statistics on Query Expressions for Optimization" Proceedings of the 2002 ACM SIGMOD International Conference on Data Management (SIGMOD '02), Madison, WI, Jun. 4-6, 2002, pp. 263-274.
Chaudhuri, S. "An Overview of Query Optimization in Relational Systems" Proceedings of the ACM SIGACT-SIGMOD-SIGART Symposium on Principles of Database Systems (PODS '98), Seattle, WA, Jun. 1-4, 1998, pp. 34-43.
Chaudhuri, S. et al. "Rethinking Database System Architecture: Towards a Self-Tuning RISC-style Database System" Proceedings of the 26th International Conference on Very Large Databases (VLDB 2000), Cairo, Egypt, Sep. 10-14, 2000, pp. 1-10.
Chen, C.M. et al. "Adaptive Selectivity Estimation Using Query Feedback" Proceedings of the 1994 ACM SIGMOD International Conference on Management of Data (SIGMOD '94), Minneapolis, MN, May 24-27, 1994, pp. 161-172.
Derr, M.A. "Adaptive Query Optimization in a Deductive Database System" Proceedings of the 2nd International Conference on Information and Knowledge Management (CIKM '93), Washington, DC, Nov. 1-5, 1993, pp. 206-215.
Ganek, A.G. et al. "The dawning of the autonomic computing era" IBM Systems Journal, 2003, vol. 42, No. 1, pp. 5-18.
Gassner, P. et al. "Query Optimization in the IBM DB2 Family" Data Engineering, Dec. 1993, vol. 16, No. 4, pp. 4-18.
Getoor, L. et al. "Selectivity Estimation using Probabilistic Models" Proceedings of the 2001 ACM SIGMOD International Conference on Management of Data (SIGMOD '01), Santa Barbara, CA, May 21-24, 2001, pp. 461-472.
Gorman, T. "The Search for Intelligent Life in the Cost-Based Optimizer" Jul. 2001, v1.0, pp. 1-11.
IBM "DB2 Universal Database Slashes Administration Costs by Reducing Time Spent on Administrative Tasks by up to 65 Percent" MarketWire, Sep. 9, 2004, pp. 1-3, located at http://www.marketwire.com/mw/release_html-b1?release_id=72387.
Ives, Z.G. et al. "An Adaptive Query Execution System for Data Integration" Proceedings of the 1999 ACM SIGMOD International Conference on Management of Data (SIGMOD '99), Philadelphia, PA, Jun. 1-3, 1999, pp. 299-310.
Lightstone, S.S. et al. "Toward Autonomic Computing with DB2 Universal Database" ACM SIGMOD Record, Sep. 2002, vol. 31, No. 3, pp. 55-61.
Markl, V. et al. "LEO: An autonomic query optimizer for DB2" IBM Systems Journal, 2003, vol. 42, No. 1, pp. 98-106.
Scheuermann, P. et al. "Adaptive Algorithms for Join Processing in Distributed Database Systems" Distributed and Parallel Databases, 1997, vol. 5, pp. 233-269.
Slivinskas, G. et al. "Adaptable Query Optimization and Evaluation in Temporal Middleware" Proceedings of the 2001 ACM SIGMOD International Conference on Management of Data (SIGMOD '01), Santa Barbara, CA, May 21-24, 2001, pp. 127-138.
Valentin, G. et al. "DB2 Advisor: An Optimizer Smart Enough to Recommend Its Own Indexes" Proceedings of the 16th International Conference on Data Engineering, Feb. 29-Mar. 3, 2000, pp. 101-110.
Zilio, D. et al. "Self-Managing Technology in IBM DB2 Universal Database8" Proceedings of the 10th International Conference on Information and Knowledge Management (CIKM '01), Atlanta, GA, Nov. 5-10, 2001, pp. 541-543.
Office Action dated Apr. 20, 2007 for U.S. Appl. No. 10/936,449.
Office Action dated Apr. 19, 2007 for U.S. Appl. No. 10/936,205.
Office Action dated Sep. 6, 2007 for U.S. Appl. No. 10/936,205.
Office Action dated Aug. 9, 2007 for U.S. Appl. No. 10/935,906.
Office Action dated Jan. 26, 2007 for U.S. Appl. No. 10/936,427.
Office Action dated Aug. 22, 2007 for U.S. Appl. No. 10/936,427.
Office Action dated Jan. 25, 2007 for U.S. Appl. No. 10/936,778.
Ioannidis et al, "Parametric Query Optimization", Proceedings of the 18 VLDB Conference, Vancouver, BC, Canada 1992, pp. 103-114.
Office Action dated Feb. 22, 2007 for U.S. Appl. No. 10/936,468.
Office Action dated Aug. 22, 2007 for U.S. Appl. No. 10/936,468.
Office Action dated Feb. 7, 2007 for U.S. Appl. No. 10/936,781.
Office Action dated Jul. 30, 2007 for U.S. Appl. No. 10/936,781.
Office Action dated Jan. 24, 2007 for U.S. Appl. No. 10/936,779.
Office Action dated Aug. 22, 2007 for U.S. Appl. No. 10/936,779.
Office Action dated May 1, 2007 for U.S. Appl. No. 10/936,426.
Office Action dated Sep. 6, 2007 for U.S. Appl. No. 10/936,426.
Office Action dated Nov. 25, 2008 for U.S. Appl. No. 10/935,906.
Office Action dated Apr. 9, 2008 for U.S. Appl. No. 10/935,906.
Office Action dated Oct. 31, 2008 for U.S. Appl. No. 10/936,779.
Office Action dated May 13, 2008 for U.S. Appl. No. 10/936,779.
Office Action dated Dec. 15, 2008 for U.S. Appl. No. 10/936,426.
Office Action dated Oct. 16, 2008 for U.S. Appl. No. 10/936,205.
Office Action dated Mar. 24, 2008 for U.S. Appl. No. 10/936,205.
Office Action dated Nov. 10, 2008 for U.S. Appl. No. 10/936,781.
Office Action dated Apr. 1, 2008 for U.S. Appl. No. 10/936,781.
Office Action dated Oct. 15, 2008 for U.S. Appl. No. 10/936,468.
Office Action dated Mar. 18, 2008 for U.S. Appl. No. 10/936,427.
Office Action dated Apr. 2, 2008 for U.S. Appl. No. 10/936,468.
Office Action dated Sep. 22, 2008 for U.S. Appl. No. 10/936,449.
Office Action dated Oct. 20, 2008 for U.S. Appl. No. 10/935,908.
Office Action dated Jul. 17, 2008 for U.S. Appl. No. 10/935,908.
Office Action dated Apr. 30, 2008 for U.S. Appl. No. 10/935,908.
Office Action dated May 2, 2007 for U.S. Appl. No. 10/935,908.
Office Action dated Dec. 29, 2008 for U.S. Appl. No. 10/936,468.
Office Action dated Oct. 8, 2008 for U.S. Appl. No. 10/936,778.
Office Action dated Jul. 24, 2008 for U.S. Appl. No. 10/936,778.
Office Action dated Sep. 23, 2008 for U.S. Appl. No. 10/936,426.
Office Action dated Mar. 20, 2008 for U.S. Appl. No. 10/936,426.
Office Action dated Jan. 22, 2009 for U.S. Appl. No. 10/936,778.
Office Action dated Jan. 25, 2007 for U.S. Appl. No. 10/935,906.
Notice of Allowance dated Feb. 4, 2010 for U.S. Appl. No. 10/936,778.
Notice of Allowance dated Jan. 27, 2010 for U.S. Appl. No. 10/936,781.
Notice of Allowance dated Apr. 19, 2010 for U.S. Appl. No. 10/935,908.
Final Office Action dated Dec. 8, 2009 for U.S. Appl. No. 10/936,779.
Final Office Action dated Nov. 20, 2009 for U.S. Appl. No. 10/935,906.
Final Office Action dated Nov. 12, 2009 for U.S. Appl. No. 10/936,781.
Notice of Allowance dated Sep. 29, 2009 for U.S. Appl. No. 10/936,205.
Final Rejection dated Nov. 12, 2009 for U.S. Appl. No. 10/936,468.
Office Action dated Nov. 27, 2009 for U.S. Appl. No. 10/935,908.
Notice of Allowance dated Sep. 23, 2009 for U.S. Appl. No. 10/936,449.

(56) References Cited

OTHER PUBLICATIONS

Markl et al. "Learning Table Access Cardinalities with LEO" SIGMOD '02; Jun. 3-6, 2002, p. 613.
Stillger et al. "LEO—DB2's Learning Optimizer" VLDB 2001.
Notice of Allowance dated Apr. 16, 2009 for U.S. Appl. No. 10/936,426.
Office Action dated Apr. 29, 2009 for U.S. Appl. No. 10/936,781.
Office Action dated Apr. 29, 2009 for U.S. Appl. No. 10/935,908.
Office Action dated May 12, 2009 for U.S. Appl. No. 10/936,779.
Notice of Allowance dated May 6, 2009 for U.S. Appl. No. 10/936,205.
Office Action dated Sep. 6, 2007 for U.S. Appl. No. 10/936,449.
Office Action dated Mar. 28, 2008 for U.S. Appl. No. 10/936,449.
Office Action dated Mar. 4, 2009 for U.S. Appl. No. 10/936,449.
Office Action dated Apr. 3, 2009 for U.S. Appl. No. 10/936,468.
Office Action dated Mar. 31, 2009 for U.S. Appl. No. 10/936,427.
Office Action dated May 11, 2009 for U.S. Appl. No. 10/935,906.
Office Action dated Jul. 2, 2009 for U.S. Appl. No. 10/936,778.

\* cited by examiner

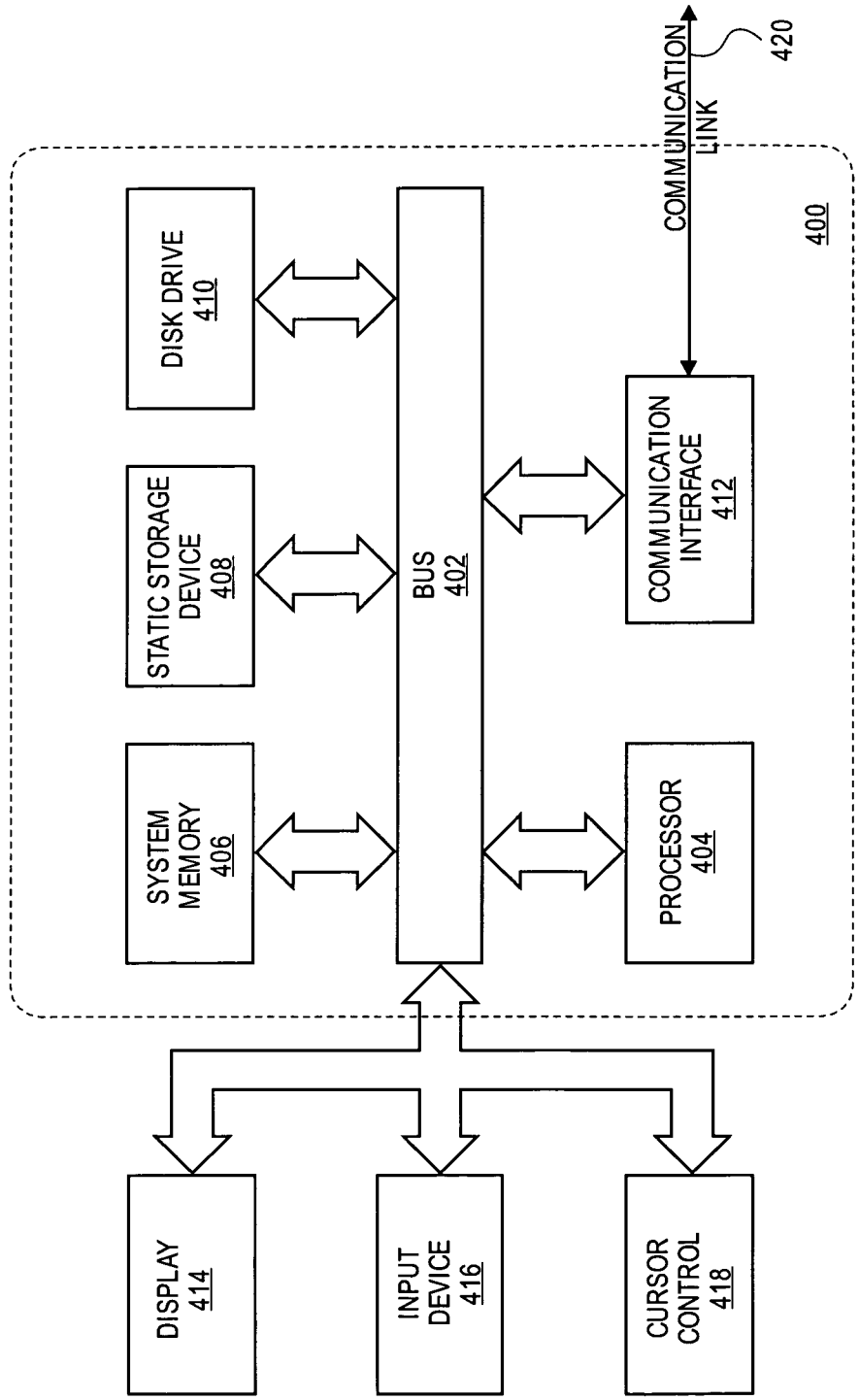

METHOD FOR INDEX TUNING OF A SQL STATEMENT, AND INDEX MERGING FOR A MULTI-STATEMENT SQL WORKLOAD, USING A COST-BASED RELATIONAL QUERY OPTIMIZER

CROSS-REFERENCE TO RELATED APPLICATIONS

This application claims the benefit of U.S. Provisional Application No. 60/500,490, filed Sep. 6, 2003, which is incorporated herein by reference in its entirety. This Application is related to applications "SQL TUNING SETS," with U.S. application Ser. No. 10/936,449, now published as U.S. Publication No. 2005/0125393; "AUTO-TUNING SQL STATEMENTS," with U.S. application Ser. No. 10/935,908, now published as U.S. Publication No. 2005/0120000; "SQL PROFILE," with U.S. application Ser. No. 10/936,205, now published as U.S. Publication No. 2005/0125452; "GLOBAL HINTS," with U.S. application Ser. No. 10/936,781, now published as U.S. Publication No. 2005/0125398; "SQL TUNING BASE," with U.S. application Ser. No. 10/936,468, now published as U.S. Publication No. 2005/0097091; "AUTOMATIC LEARNING OPTIMIZER," with U.S. application Ser. No. 10/935,906, now published as U.S. Publication No. 2005/0119999; "AUTOMATIC PREVENTION OF RUN-AWAY QUERY EXECUTION," with U.S. application Ser. No. 10/936,779, now published as U.S. Publication No. 2005/0177557 "SQL STRUCTURE ANALYZER," with U.S. application Ser. No. 10/936,426, now published as U.S. Publication No. 2005/0120001; "HIGH-LOAD SQL DRIVEN STATISTICS COLLECTION,"," with U.S. application Ser. No. 10/936,427, now published as U.S. Publication No. 2005/0138015; "AUTOMATIC SQL TUNING ADVISOR," with U.S. application Ser. No. 10/936,778, now published as U.S. Publication No. 2005/0125427, all of which are filed Sep. 7, 2004 and are incorporated herein by reference in their entirety.

FIELD OF INVENTION

This invention is related to the field of electronic database management.

BACKGROUND

A relational database (RDBMS) consists of a set of tables. SQL queries are posed against the table set to obtain information from the database. SQL is a declarative language, which only specified what data is to be retrieved and does not specify how to retrieve it. The Query Optimizer is the component of a relational database that determines the strategy for how the data requested by the query should be retrieved (this is called the query execution plan). Modern relational databases use a cost-based query optimizer, which determines the possible execution plans, assigns a cost value to each plan and picks the one with the least cost. The cost is measure of the resources, such as CPU, IO and memory required to execute the query using the given plan and hence lower the cost, faster the query would execute.

Access Structures such as Indexes and Materialized views are two key mechanisms for speeding up data retrieval in a relational database. Without such structures, the database must resort to scanning the entire table (known as full-table scan) to retrieve the required set of rows. Hence having efficient access structures is very important for query execution performance. The optimizer looks at all available access structures to determine what the best execution plan is. An index is a structure that allows the database to quickly retrieve rows that satisfy a given condition. An index is built on one of more columns of a table—these columns are known as the index key. There are several different types of indexes, most common being the B*Tree Index and the Bitmap Index. A B*Tree index is primarily useful when the query requests a specific value or range of values of the index key and when there are only a few rows to be retrieved. A Bitmap Index is useful when the query involves several conditions on the index keys, connected by Boolean (AND/OR) operators.

A materialized view (MV) is used to pre-compute and store the results of a query into the database and can be used to answer the same or similar queries. MVs improve query performance because they save redundant computation and also because significantly less data may be needed to retrieve the result. Since a materialized view stores results in a database table, indexes can also be created on a materialized view to further speed up access to its data.

For a given table, several different indexes can be created in order to improve query performance. For instance for a table T with two columns a and b, the following indexes could exist: (a), (b), (a,b), (b,a). Note that due to the nature of an index structure, the ordering of columns in the index key is significant. As the number of columns increases, so do the choices for indexes to build. Indexes occupy storage and take up resources to build. Further they should be maintained (updated) when the data in the table changes. So it is not feasible to create all possible (or even a large number of) indexes in a database.

The basic problem that conventional methods are unable to solve is determining the best set of indexes to create to speed up the execution of a set of SQL queries (known as SQL workload), within a given storage limitation. Because indexes consume resources of storage and computational cost for build and maintenance, a few indexes that satisfy a multiplicity of queries should be created.

Given a set of available indexes, the final choice of execution plan of a query is made by the query optimizer using its cost model. There may be several ways in which the database can use an index to access a table. Sometimes, the optimizer cannot use an index because of complex internal rules that get violated. Also, the optimizer itself has a lot of choices in coming up with an execution plan and every RDBMS typically employs heuristics that restrict the available choices. In other words, is very complex, if not impossible for an end-user to determine reliably how the optimizer would use any index and which of the several possible plans would ultimately have the lowest cost.

The broader problem is that conventional tools are unable to determine the ideal combination of access structures, including both materialized views and index for a given SQL workload, or the SQL Access Structure Tuning problem. This problem has typically been attempted to be solved in three ways. One is for an experienced Database Administrator (DBA) creates indexes to tune the SQL statements. This type of tuning is based on knowledge of the general query optimization process and relies of rules-of-thumb and knowledge of application access patterns. This type of analysis has the following problems. The analysis relies heavily on experience of the DBA. A novice DBA performing this task can wreak serious havoc on the system performance by not properly considering all the costs. The number of queries that can be manually tuned is limited.

Another conventional way is for a software tool to sit on top of the RDBMS and use a cost model to weigh different index choices. Example: Oracle Expert. This class of tools has the following problems. The cost model used by the tool tries to imitate the optimizer but cannot really guarantee that the resulting indexes would be used when the query is run. Because the tool is not integrated into the optimizer, it has to incorporate rules for how an optimizer uses indexes. Since these rules can change over time, the tool can soon become out-of-sync and needs to be modified, typically with every new version of the RDBMS software.

Another conventional tool sits on top of the RDBMS and uses some external utility provided by the RDBMS to evaluate various index structures, such as Microsoft Index Tuning Wizard for example. This class of tools has the following problems. The information accessible to this tool is limited to that provided by the external utility. For example, it may not have access to the internal cost estimates of the optimizer. It is not possible for the tool's analysis to be interspersed with the optimization process, since the optimizer is but a black box to this tool. For instance, the optimizer may try various intermediate transformations and we may need to evaluate different index strategies for each of these transformations.

SUMMARY

An access structure analysis method is interspersed with the query optimization process. The method can determine the ideal combination of access structures, including both materialized views and indexes, for a given database workload. The interspersed structure analysis method can include advanced transformations like view merging, star transformation, bitmap access plans, query rewrite using materialized views, for example. The method may be performed using the query optimizer's rules as heuristics to guide the index candidate generation process.

For example, the method can use the optimizer's selectivity estimates to define WHERE clause candidates. Thus, the method can intelligently generate candidates using the RDBMS's knowledge of query optimization. Because of this integrated aspect, the tool can automatically pick up many enhancements made to the query optimizer. Also, the analysis can take into account actual system behavior such as volatility of the tables (i.e. DMLs on the table) to calculate index maintenance impact and materialized view refresh costs. Also, the method can apply a user-defined priority for each of several queries, to perform index merging integrated with candidate generation process to reduce the amount of candidates that are considered.

BRIEF DESCRIPTION OF THE DRAWINGS

FIG. 4 shows an example of a system to perform the method of index tuning and merging using the cost based optimizer.

DETAILED DESCRIPTION

Overview

The embodiments of the invention are described using the term "SQL", however, the invention is not limited to just this exact database query language, and indeed may be used in conjunction with other database query languages and constructs.

A method of using a cost-based query optimizer to determine the best choice of indexes for a given SQL statement is disclosed. The method uses optimizer heuristics to reduce the number of indexes that need to be considered. It includes an integrated Index Merging component that consolidates indexes to satisfy multiple queries in a multi-statement SQL workload. It can handle various index types such as B*Tree, Bitmap and Functional Indexes and incorporate indexing requirements for complex transformations such as star transformation and query rewrite with materialized views. The method includes a model to determine the impact of index maintenance before recommending an index.

In one embodiment, the method is performed by an Index Analyzer, which is a component of a SQL Access Advisor. The SQL Access Advisor recommends a combination of materialized views, indexes and indexes on materialized view for a given set of SQL queries, within specified storage constraints. The method can also be performed by a SQL Tuning Advisor, which recommends tuning strategies for a single SQL statement by considering statement rewrites, improved estimation of optimizer statistics and index solutions.

Figure 1:
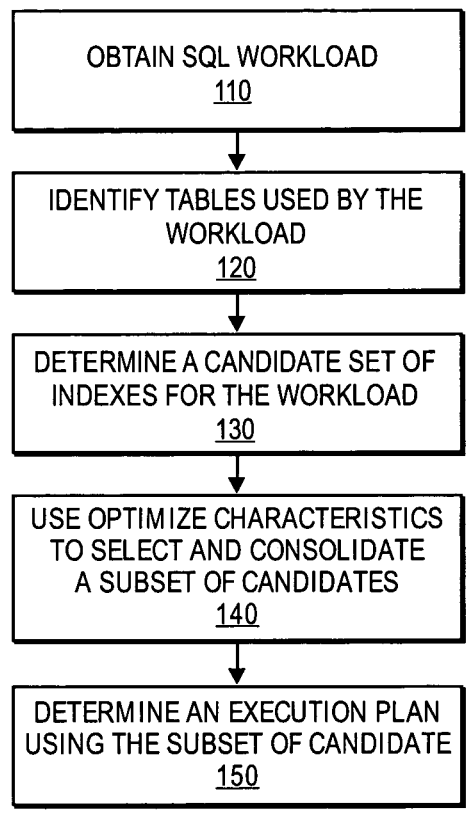
FIG. 1 shows an example of index tuning and index merging using a cost based optimizer.

An example of a method for index tuning and index merging is shown in FIG. 1. A workload of SQL statements is obtained, 110. Tables used by the workload are identified, 120. A set of candidate indexes are generated, 130, and a small subset of candidate indexes is selected from the set based on optimizer heuristics and consolidation of indexes used by multiple queries, 140. This consolidated subset of indexes is then used to determine an execution plan for the statement, 150.

Figure 2:
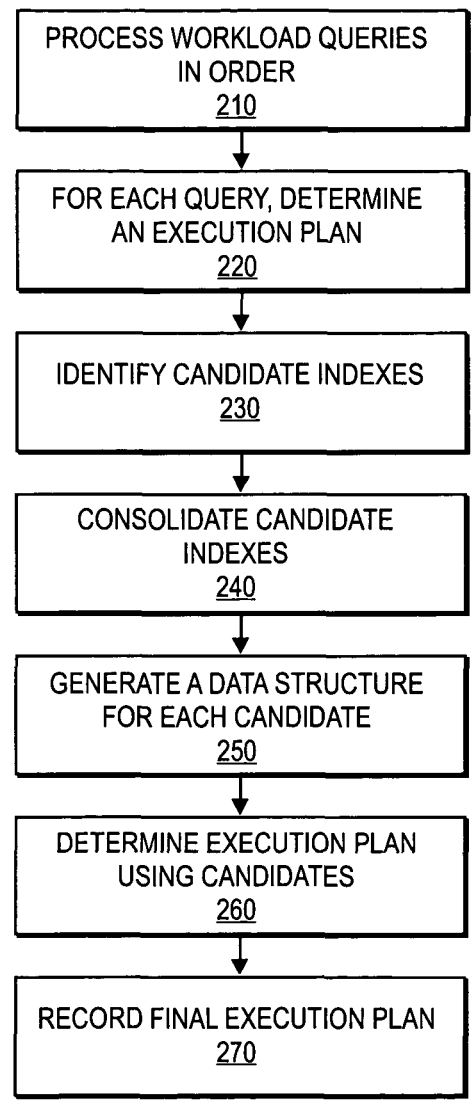
FIG. 2 shows an example of generating candidate indexes for the method of FIG. 1.

An example of the candidate generation process is shown in FIG. 2. The workload queries are processed in a user specified order, 210. For each query, an execution plan is determined, 220. The candidate indexes are identified, 230. A model is used to remove candidates that are expensive. For example, volatile indexes are identified and removed from the set. The indexes that are used by other queries are consolidated by merging them with indexes for the other queries, 240, so that system resources are not consumed by redundant indexes. A temporary structure is created to store metadata, but not data, for each candidate index, 250. The optimizer then determines an optimized execution plan, 260, and records the plan, 270, for the query. A more detailed explanation of this process now follows. By definition, the problem involves tuning a set of SQL statements in order to determine the access structures to create. The method obtains this set of SQL statements, also known as the SQL Workload. One way of obtaining workload is from a user who provides the SQL statement text in a table. Another is from a RDBMS that caches execution plans for recently executed and currently active SQL statements. This cache can be used as a source of the current workload.

Once the workload has been collected, the SQL Access Advisor analyzes the workload by performing analyses of referenced tables, existing structures, index candidates, materialized view candidates, and index on materialized views. For the Referenced Table Analysis, the method determines the set of interesting tables i.e. the tables that are used by the queries in the workload. This can also be done at the time of workload collection. For the Existing Structure Analysis, information about the existing materialized views and indexes on that table is loaded for each table in the referenced table list. This information can be used by the index and materialized view candidate analysis phases. For the Index Candidate Analysis, the method determines the best set of indexes for the statements in the workload, and records this information along with the cost and details of execution plan used by the optimizer. For the Materialized View Candidate Analysis, the method determines the best set of materialized views for the statements in the workload. For the Index on Materialized View Analysis, the method rewrites the statement using the materialized views generated in the materialized view candidate analysis, and determines the indexes for the rewritten statement.

Once all the candidates are available, the SQL Access Advisor goes through a process that enumerates various combinations (known as configurations) of indexes and materialized views to satisfy the given storage constraint. For each configuration, it determines the optimizer cost of using that configuration by using the information obtained in the candidate generation phase. Several heuristics can be used to prune the configurations enumerated. The configuration with the best cost is then given as the recommendation for the workload. Some of the information recorded during the candidate generation process is used to prune unnecessary configurations and also to generate additional useful configurations.

The candidate generation method performed by the SQL Access Advisor tool is performed as follows. Process the queries in the workload in a user-specified order, processing the most important statements first. The relative importance of a statement may be determined by several factors such as the query's execution cost, a user-defined priority and frequency of execution. For instance, the user may specify that the most expensive queries may be analyzed first. Some heuristics used in this process can rely on the fact that the queries processed first are more important to the user than the ones processed later.

Each query is parsed and then sent to the optimizer. The optimizer will process each query block, one by one, to determine the best execution plan. At various points during its analysis, the optimizer makes a callback to the candidate generation process. In this callback, various constructs in the query structure are analyzed to determine possible indexes that could be used by the optimizer to speed up this query with respect to that construct. These indexes are the candidate indexes. Examples of constructs analyzed by this method include the WHERE clause, GROUP BY clause, ORDER BY clause, JOIN predicates, sub-queries, WINDOW functions. For each of these constructs, one or more indexes may be created. The query is also analyzed as a candidate for star transformation, functional indexes and for bitmap index access.

The table and columns involved are checked against various criteria before including them into a candidate index. In particular, a model is used to determine if the volume of DML (insert/update/delete) being done on the particular table or column would make the index prohibitively expensive.

Each candidate index generated for a particular construct is examined with respect to those generated for other constructs to consolidate them if possible. For example, if the query has GROUP BY a,b and ORDER BY b,a,c, then one candidate index (b,a,c) can be generated, since the ordering of columns is significant for the ORDER BY but not so for the GROUP BY clause.

Next, the indexes chosen by the optimizer are examined for any previous queries, to look for any opportunities for consolidation of the indexes. This process is called index merging. This means that instead of creating two different indexes for two queries, the process may create one slightly different index that can satisfy both of them. The trade-off to consider is that the merged index may be larger in size and hence incur a larger cost in the execution plan. The process may do this in a heuristic fashion with the assumption that the queries processed first are more important and so any trade-offs during index merging will not greatly compromise the functionality of the indexes for the previous queries. The process can do this, because this method is integrated into the optimizer and hence it knows exactly how the optimizer will use any particular index. The merged indexes obtained in this way are added to the list of candidate indexes. Thus, the concept of index merging is extended by this approach to be performed by the optimizer, which picks merged indexes, and does it in a single integrated pass with the candidate generation phase.

For each candidate index, the process generates a temporary in-memory structure that looks just like a real index to the optimizer. This structure has metadata but no data and does not occupy any disk space. The process generates statistics on this index by using the statistics on the underlying tables.

Once the callback finishes, the optimizer now continues its analysis, however it now also includes the candidate index structures in its analysis, along with any existing real index structures. The optimizer evaluates various possible execution plans and determines the best execution plan, possibly involving the candidate indexes. Once the final plan is chosen, a callback is again performed. In this callback, the process records the plan used by the optimizer for this statement and the (candidate or real) indexes if any used by that plan. This information can be used by the index merging process and can also be used to provide a rationale to the user explaining how and why the index was picked.

This process is repeated for every query in the workload. At the end of the process, a set of ideal index solutions for the given SQL workload is created. Because the optimizer itself picks the indexes used in the execution plan of a query, the indexes if actually implemented will be used by the optimizer if that query is issued. This process can make use of the internal optimizer heuristics to quickly determine a small subset of candidate indexes on each table to satisfy the given query, so it does not need to evaluate all possible indexes. Some index candidates are specific to a transformation done by the optimizer, such as star transformation. Because this process is interspersed with the optimization process, it will generate these special candidates if the optimizer considers the query for that transformation, which avoids unnecessary candidate indexes. When the optimizer is enhanced to use an index in a new way, this process will automatically pick up this new access method.

In order to perform the analysis, this process does not need to actually create an index in the database. Instead, it can create a temporary structure in memory with enough statistical information needed for the optimizer to make its choices. This method also uses the optimizer to consolidate indexes needed for multiple queries so that resources are not consumed by redundant indexes. The method can provide a detailed rationale to the end-user explaining why and how the index will be used. This gives the DBA an insight into the optimizer's view of the query and therefore builds confidence in the tool's recommendations. Also, this process will try to avoid candidates, which may have a high index maintenance impact on the system.

Query Structure Analysis to Determine Candidate Indexes

A SQL statement usually has several clauses such as SELECT, FROM, WHERE, GROUP BY, ORDER BY. The WHERE clause contains selection predicates that select specific rows out of a table and join predicates that specify how to join two tables. The method analyzes the SQL statement and uses various heuristics in order to come up with a set of possible index solutions for each table referenced in the query. These are known as candidate indexes.

The optimizer can use an index to speed up a query in various ways depending on what clauses are present in the statement, such as index equality lookup and range scan; sort-avoidance; indexed-nested loop join; and index-only access.

Index Equality Lookup and Range Scan: The optimizer will try to match columns in selection predicates to index keys. The predicates will be used to identify a range of index leaf blocks containing the addresses of table rows that satisfy those predicates. Hence this type of access is called an Index Range Scan. The predicates used for a range scan are known as start and stop keys. Predicates that cannot be used as start/stop keys are retained as filter predicates and applied when scanning the table. For equality predicates, the process can use an index if the predicate columns form a leading prefix of the index key. For example, with predicates, a=1 and b=3 and c=5, the process can use an index (a,b,c) or (b,c) or (c,b,a) etc. Given a bunch of equality predicates and an index using them as start/stop key predicates, the order of predicates may be not very significant in terms of whether the index can be used on not. However, an index that selects fewer rows out of a table is preferable to one that selects more rows—this is determined by the selectivity of the predicates that match the index keys. Several equality predicates can be used as index start/stop keys but only one in-equality predicate can be considered as a start/stop key for an index scan access path (and it precludes any subsequent index columns from being used in start/stop keys).

Sort-Avoidance: If the query has a GROUP BY clause and there is an index with all the columns, then the optimizer can avoid a sort if the table is accessed by the index. If the query has both a GROUP BY and ORDER BY clause, the optimizer will try to re-order the group by columns to match the order by clause. If there is an index that has all the columns in the ORDER BY clause, the optimizer can avoid a sort by using the index.

Indexed-Nested Loop Join: If there is an index on a column used in a join, the optimizer can do an efficient nested loop join with that table as the inner table.

Index-Only Access: If all columns of the table, needed by the query are present in an index, the optimizer will use the index and not need to access the table at all.

Based on these types of rules, each clause of the SQL statement is analyzed to produce index candidates. Procedures for performing the analysis method is presented below.

Candidate Generation for WHERE Clause:

There can be a large number of different indexes possible based on different combinations of columns used as the index start/stop keys. For a query with several predicates, the number of candidate indexes is therefore quite large. The process can use the following heuristic to come up with very few candidates for the query by using some of the optimizer statistics.

Selectivity of predicate is defined as number of rows retrieved by using the predicate/total number of rows in table. Selectivity is a number between 0 and 1, lower the number for a predicate, fewer rows are retrieved from a table using that predicate. A predicate that retrieves fewer rows from a table is known as more selective.

With respect to selectivity, an index that handles the more selective predicates first would reduce the number of rows retrieved from a table. So columns from the more selective predicates should be placed first in the index. Also, the net selectivity of two predicates connected by an AND operator is the product of the selectivity of the predicates. Since the best an index can do is to retrieve one row out of a table, the best possible selectivity is 1/N where N is number of rows of a table. So the process does not get any further benefit from an index whose selectivity would be <1/N. This value is the selectivity limit. In addition, if a column used in an index is referenced in an inequality predicate, no further index columns can be used as start/stop keys. So the process tries to add columns used in equality predicates before those used in inequality predicates and at most one column used in in-equality predicates is useful in an index.

Based on these observations, the process can perform the following procedure to identify candidate indexes for the WHERE clause. For each table in the query, the method can use the optimizer's predicate manager to determine the selectivity of the selection predicates, by each column. If there are multiple predicates on the same columns, such as a>3 and a>5, we use the lower of the two selectivity values as the net selectivity. If there are two range predicates such as a>5 and a<10 with selectivity s1 and s2, the process can compute the net selectivity as (s1+s2−1). Once this is done for all predicates, the process now has one selectivity number associated with (predicates related to) each column, which can be sorted by decreasing net selectivity values computed above, to produce list L.

Using this information, candidates are generated as follows. Compute the selectivity limit S as 1/N where N is the number of rows in the table. Generate a candidate C1 by including columns from the above list L, at the same time computing the net selectivity of the index as the product of the selectivity of the columns added so far. When the limit S is hit, stop adding columns. If there are no inequality predicates, then generate the one candidate above. If there are inequality predicates, then generate one candidate by including columns according to order imposed by L, until the first inequality predicate is reached or limit S is reached. The process can generate a second candidate by skipping over the inequality predicates and only including equality predicates until limit S is reached. If S is not reached, the process then adds the first skipped inequality predicate (i.e. one with the lowest selectivity) column at the end. If there is a tie for the first inequality predicate (based on selectivity values), the process can generate additional candidates for each tied inequality predicate. If one of the candidates generated thus uses almost all the columns the query needs, except up to 2 columns, then add these remaining columns to the candidate. This allows the query to have an index-only access for that table.

Candidate Generation for JOINS

An expensive part of the optimization process is determining what order to join the tables in. Due to the number of possible join orders involved, the optimizer uses various heuristics to eliminate some join orders.

Candidates for joins can be generated as follows. For each join between two tables, generate an index candidate on the join columns of each table. These indexes on join columns would allow the optimizer to consider an indexed nested loop join and also to avoid a sort in a sort-merge join.

Alternatively, when the optimizer performs join-order enumeration, it can make a callback to this process. At this point, since the process knows which tables are joined together prior to the current table, it can generate additional multi-column index candidates using columns in joins between the current tables and the prior joined tables.

Sort-Avoiding Index Candidates

When a query has GROUP BY or ORDER BY clauses, the database does a sort of the rows in order to evaluate these clauses. If all the columns involved in these clauses are in the same table, and an index is present on those columns, the rows retrieved by using the index are already in sorted order and hence the sort can be avoided. This can result in huge savings in query execution time and hence such indexes are very useful.

If the query has a GROUP BY or ORDER BY clause, all of whose columns are from same table, then generate one candidate on those columns. If both clauses are present, the optimizer will re-order the GROUP BY clause to match the ORDER BY clause. Based on this behavior, it can generate a candidate according to the ORDER BY columns. It also generate sort-avoiding index candidates for Window Function PARTITION BY, ORDER BY clauses. The logic for these clauses is identical to that for GROUP BY and ORDER BY clauses, respectively.

Other Index Candidates

Bitmap Indexes are useful for queries that involve AND and OR predicates on columns that have only a few possible values, e.g. gender has only two values Male and Female. The process can generate bitmap index candidates based on the following properties. Bitmap Indexes can be efficiently combined using AND/OR operation. Hence, the process can generate single-column bitmap candidates. A column will be considered as a bitmap index candidate provided its cardinality is <1% of the cardinality of the table. The bitmap access path can actually also be used with B*Tree indexes (if the column cardinality is low) by converting the rowids in the leaf blocks of the B*Tree to bitmaps. Hence the process may not generate a bitmap index is a B*Tree index on that column already exists. The process can generate bitmap candidates provided that the DML volume on the column is not very high.

For Star Transformation, if the optimizer is about to try star transformation on the query, it will analyze the query and generate bitmap index candidates on the foreign key column of the fact table. This is an example of how the index candidate generation can be interspersed with optimizer processing and hence avoids unnecessary candidates. The table which is to be considered as the fact table and whether star transformation is to be considered is decided by the optimizer and we need to generate this type of candidate only if necessary.

To perform an OR Expansion when there is an OR predicate in the query, the optimizer uses a technique known as OR expansion when it has predicates connected by OR, of the form (t1.a=1 OR t2.b=5). In this case, the query block is split into two query blocks connected by a UNION ALL. If and when the optimizer chooses to split the query in this manner, when this method is invoked it will generate appropriate index candidates for each query block. This is another example of how the index candidate generation is interspersed with optimizer processing.

Index Column Re-Ordering

The ordering and position of the index key columns may or may not be significant depending on the access path being used for the given query. For instance, an index used to avoid a GROUP BY sort does not rely on a particular order of the GROUP BY columns, however one used for ORDER BY must have the same order as specified by the ORDER BY clause. For each candidate generated, this information is captured as follows.

For each column in the candidate index, assign a number, called its KEY_ID. Consecutive columns that can be re-ordered amongst them are assigned the same KEY_ID. Suppose an index has N columns, col(0) ... col(N). Let key(i) be the KEY_ID for col(i). The KEY_IDs are assigned as follows:

key(0)=1
FOR i=0 ... N
IF col(i) can be reordered with col(i−1),
THEN key(i)=key(i−1)
ELSE key(i)=i The N-tuple of KEY_IDS of all columns in the index is called the KEY_ID of the index. For index only columns the KEY_ID will be MAX_KEY_ID (Max # of columns in index i.e. 32+1) to indicate that they can be placed arbitrarily in the index. In the generated candidates, index-only columns will be placed last.

Note that the KEY_ID values are not necessarily consecutive (dense) but are either the same as that of the previous column (key(i−1)) or equal to the current ordinal position(i). This allows the method to reassign the KEY_ID of any column without changing the remaining KEY_ID values.

The KEY_ID will be used in determining if the optimizer's current candidate can be modified to match or consolidate it with an existing candidate and vice versa.

Consolidating Candidates for Various Clauses

After generating candidates for various clauses, the process can consolidate them with each other so that one index can satisfy multiple clauses if possible. The process of consolidating indexes is known as index merging. In addition to consolidating candidates for different clauses, index merging is also used to merge candidates across multiple queries.

Figure 3:
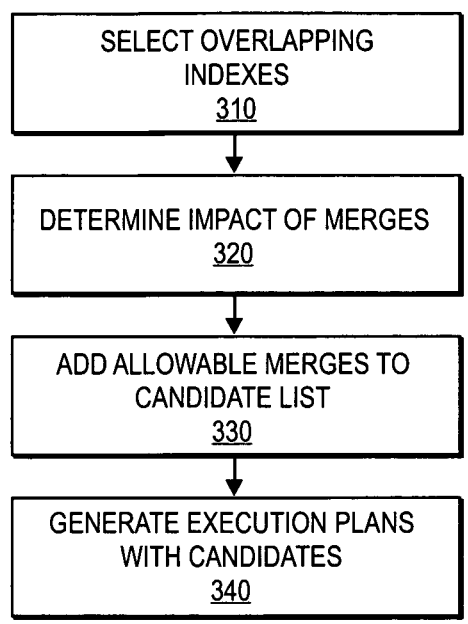
FIG. 3 shows an example of merging indexes for the method of FIG. 1.

An example of consolidating candidates is shown in FIG. 3. Overlapping indexes are selected, 310. An impact of merging indexes is determined, 320. Allowable merges are added to the candidate list, 330. An execution plan for the statement is then generated using the consolidated candidates, 340.

Index Merging

In most databases, the indexing requirements of queries overlap to a large extent. The purpose of index merging is to try and consolidate slightly varying index candidates into fewer ones. In doing so, the process tries to maintain the effectiveness of the indexes as much as possible. The consolidation allows the requirements of more queries to be fit into fewer indexes, thereby improving performance and reducing storage requirements. One of the challenges involved in this process is to determine the effectiveness of the merged index compared to the original ones. As the compilation of a query can be very expensive and index merging is an iterative process, the process is designed to reduce or minimize the number of times the compilation process is performed for each query.

After the initial candidates have been generated, the process will identify any candidates that are similar to the current candidates and are chosen by the optimizer as ideal indexes for a previous query. The two candidates are then merged to generate additional candidates. This may be performed in a heuristic fashion with the assumption that the queries processed first are more important to the user and so any tradeoffs during index merging should not compromise the functionality of the indexes for the previous queries, because the optimizer knows how it will use any particular index. The optimizer can be configured to favor an execution plan using the merged candidates over execution plans using completely new candidates, based on heuristics involving the plan costs, storage savings and the relative importance of the affected queries.

In this approach, the optimizer's analysis is guided upfront so it considers the merged candidate during the access path analysis itself. The intuition is that in a realistic workload, the generated candidates will have enough commonality to allow lot of merging opportunities. Since every additional index will slow down the performance of the system, it is always preferable to have fewer indexes. An alternative approach would be to simply generate candidates for each query independently and then later merge them together.

Constructive Merging

This is used when the optimizer can merge the two indexes where one subsumes the other in functionality so the resulting index can be used for the same access path as before. For instance an index (a,b,c) and index (a,b) can be merged into (a,b,c). Here, functionality means that if the initial index made it possible to use a certain access path, the merged index should also allow the use of the same access path; otherwise some functionality is lost. However, there may be some allowable performance degradation in using the merged index over the initial index.

General Merging

This is used in cases when the two indexes overlap quite a bit but any possible merging will compromise some functionality in one index. This is used in situations when constructive merging was unsuccessful in producing any new candidates or where the loss of functionality is tolerable from the point of view of the execution plan cost and because the process can potentially get a lot of storage savings from it.

Merging Process

The merging process will generate additional index candidates. Any existing candidates are always retained. During merging, the process can assume that columns required only for index-only access can always be placed at the tail of the index and can be freely reordered.

Let $Q_c$ be the current query being processed. The Merging Algorithm proceeds as follows: For each candidate index I:

From the pool of existing candidates on that table, pick the top N indexes with most overlap to produce set C. Compute the overlap as follows:

OVERLAP($I1$, $I2$)=X*(overlapping columns with KEY_ID=1)+Y*(total number of overlapping cols).

X and Y are constants set empirically to 10 and 1 and represent how much weight to give to certain class of columns. KEY_ID=1 columns have higher weight because these are leading columns that can be freely re-ordered and hence will keep the functionality of the index intact with minimal performance degradation. For practical workloads, N can be set to 2 i.e., the process can consider at most two indexes to merge with a given index.

For each index E in C: Try a Constructive Merge of E and I. Compute the impact of the merge (see section Allowable Merge below). If merge is allowable, add the merged index to the candidate list.

Try a General Merge of E and I. Compute the impact of the merge. If the merge is allowable, add the merged index to the candidate list. For each candidate I, maintain a list of merged candidates that were acceptable. After all the merged candidates are generated, the optimizer will now attempt to generate the execution plan for $Q_C$. It will generate several execution plans involving both new candidates and the merged candidates. However, it will favor a plan using the merged candidates in place of new candidates.

Allowable Merge Method

The following method is used to calculate the impact of a merge to determine if it is an allowable merge. For example, with an existing candidate E, a current candidate I, and a merged candidate M as a result of index merging of E and I, if merged index M identical in functionality to the existing candidate E, it should have no impact. Determine the statistics for the new index. The process has statistics for the existing candidate. In particular, the following statistics are used by this method: #levels of the index; #leaf blocks of the index; and Clustering Factor of the index. The clustering factor indicates how many table blocks are to be scanned for a row retrieved from the index. It is a measure of how clustered the data is in the table, with respect to a specific index key. If the data is completely clustered on the index key, when a block of data is retrieved from the table, the process will get a large number of relevant rows in that one block access. If the data for a given index key value is strewn all over the table, then the process may, in the worst case, access one table block per row. So a smaller clustering factor indicates a good index.

For each query Q in the workload, maintain following cost values: Basecost(Q) is the current cost of the query without using the recommended indexes. This is the baseline cost that our tool is meant to improve upon. BestCost(Q) is the cost of the query with the best set of candidates found by the optimizer. CurrentCost(Q) is the current cost of the query with the current set of index candidates. Note that the Current Cost will deviate from the best cost due to the impact of index merging.

Note that when any query is analyzed by this process, the process records which indexes are used by the query, what access path is used, the cost and also the selectivity of the index. For each query (previously processed) that uses existing index candidate E, compute the delta cost of table access and index access due to the increase in index size caused by merging. Note that since the functionality of the index for the previous queries may be kept intact, the index selectivity can be assumed to be the same. In fact it may decrease due to addition of more columns. This means that the estimates are conservative. For example, if the index was used for index range scan or equality access, estimate the increase in index access cost as follows:

ΔIndexAccessCost=(#levels($M$)−#levels($E$)+index selectivity*(#leafblocks($M$)−#leafblocks($E$))).

If it is not an index-only access, increase in table access cost is as follows:

ΔTableAccessCost=index selectivity*(ClusteringFactor($M$)−ClusteringFactor($E$)).

If the index was used for a fast full scan access method, the increase is proportional to the increase in number of leaf blocks.

ΔIndexAccessCost=AccessCost ($E$)*(#leafblocks($M$)−#leafblocks($E$))/#leafblocks($E$).

If the increase in table access cost+increase index access cost, exceeds the cost of a table scan, reject the merge. Note that if the merged index avoids a sort, then add the cost of sort savings while computing the table scan cost. This means that a sort-avoiding index provides greater latitude in merging as long as it retains that property upon merging.

Next, estimate the increase in execution plan cost, ΔCost (Q), as a result of increase in index and table access costs.

ΔCost($Q$)=$f$*(ΔTableAccessCost+ΔIndexAccessCost).

The quantity f is a multiplying factor that depends on the type of join the table is involved in. If the table (for that index) is involved in a hash join or a sort merge join, the value of f is 1. If the table is involved in a nested loops join, the value of f is the cardinality of the outer table of the join. When the process obtains the execution plan for the query, Q, it saves this cardinality value as a byproduct. The new cost of the query using the merged index is estimated thus:

NewQueryCost($Q$)=CurrentCost($Q$)+ΔCost($Q$)

The process rejects the merge if the NewQueryCost(Q) deviates from the BestCost(Q) by more than Y % of the BaseCost (Q). If $$(\text{NewQueryCost}(Q) - \text{BestCost}(Q)) * 100 / \text{Basecost}(Q) > Y,$$

then reject the merge. Thus, the process can guarantee that the merged index will only degrade the execution plan of each of the previous queries by a bounded amount, Y that can in fact be specified by a user.

Allowable Constructive Merging

Given two indexes to merge, the process can attempt to do constructive merging first, to try to preserve the behavior of both indexes. In order to determine if two indexes can be constructively merged, check if all the common columns between the two indexes can be placed (after reordering) without conflicts. Further, all columns with fixed positions in either index should be accommodated without conflicts. Consider an index (a,b,c) with KEY_ID (1,1,1). The columns can now be freely reordered. Notice that each of the columns a,b,c can take a position (1-based) from 1 to 3 in the index. If another index (b,c) has KEY_ID (1,1) then each of the columns b and c can be in position 1 or 2.

In general, a column with KEY_ID n can take any positions from n to n+m−1 where m is the number of cols with the same KEY_ID. These are the allowable positions of the columns. For an index only column, all positions are allowable positions. Suppose there are two indexes $I_1$ and $I_2$. The process will try to fill in columns of merged index I in order: For each column of $I_1$ that is also in $I_2$: Determine the allowable positions of the column using the KEY_ID in $I_1$ and $I_2$. Intersect them to determine the common allowable positions. Check if at least one of those positions is free (not yet occupied by a column) in the merged index. If such a position cannot be found, constructive merge is not possible, so quit.

If one or more allowable positions are found, place the column in the lowest of those. For each column that is only in $I_1$: Determine the allowable positions of the column in that index, and check if any of them are free. If so, place the column in the lowest available position. If not then constructive merge is not possible, so quit. Next, do the same for each column that is only in $I_2$.

Now place any remaining index only columns (KEY_ID==MAX_KEY_ID) at the end of the merged index. If the process gets this far, it has performed a successful constructive merge of the two indexes. This is because it has been able to place all columns of the indexes in one of their allowable positions, thereby maintaining the functionality of each index intact.

Setting KEY_ID of the merged index: After a successful constructive merge, the process will now reassign the KEY_ID to each column in the merged as follows: Let $M_i$ be the KEY_ID of the column at position i, in the merged index. The KEY_ID of the first column, $M_1=1$. For each column $C_i$ at position i in the merged index: Let $K_1$ and $K_2$ be its KEY_IDs in 1 and $I_2$. If the column was not present in an index, assume its KEY_ID in that index is −1. Let $J_1$ and $J_2$ be the KEY_IDs in $I_1$ and $I_2$ of the previous column in the merged index, $C_{i-1}$. If $K_1=J_1$ and $K_2=J_2$ it means that the columns, $C_i$ and $C_{i-1}$ could be reordered in either index. If so, they can be reordered in the merged index and hence set the KEY_ID to be the same as that of the previous column, i.e. $M_i=M_{i-1}$. Otherwise, set the KEY_ID of the column to be the ordinal position number, i.e. $M_i=i$.

Constructive merging can be performed in cases when the lookup columns of one index are either a prefix of the other or are contained in the other.

Allowable General Merging

If constructive merging is not possible, then try to merge the two indexes using a general merge algorithm, which may lose some functionality in the newer candidate index (because the earlier queries are generally more important). Note that the index-only columns can generally be placed anywhere so the following description ignores them. Let $I_1$ be the first (existing candidate) index and $I_2$ be the second (new candidate) index. For each column that is common in both $I_1$ and $I_2$: Determine the allowable positions of the column using the KEY_ID in $I_1$ and $I_2$.

Intersect them to determine the common allowable positions. Check if at least one of those positions is free in the merged index. If not find the first free allowable position in $I_1$ that is free in the merged index and place the column there. (This is unlike constructive merging). If not such position is found, this means the indexes cannot be merged by keeping the functionality of $I_1$ intact and thus general merging is also not possible. For each column that is only in $I_1$: Determine an allowable and free position for the column and place it there. If no such position can be found, general merge is not possible. For each column that is only in $I_2$: Determine an allowable and free position for the column and place it there. If no such position can be found, then place the column in the first available position in the merged index.

If general merge was successful, reassign keys to the merged index using the same algorithm as in constructive merging. Note that if a candidate gets merged using a general merge, then it will likely be used by the optimizer with a different access path than what is initially expected, example instead of a range scan, it may get used in an index skip scan access. A general merge will only be effective provided there is a lot of overlap and little impact on access path cost. However, since any plan involving the merged candidate is chosen by the optimizer, we can rest assured that the merged candidate will actually get used if the recommended indexes are implemented.

Model for Analyzing the Impact of Table and Column Volatility on Index Choices

The method for index candidate generation can use a model that determines if a given index may be too expensive because of the high volume of changes done to the table or column. Note that this model for index maintenance cost can be useful in practice as it curbs creation of expensive indexes, however its use is optional. This model is not dependent on the approach of integrated index tuning within the optimizer. The optimizer's cost metric is used as the underlying measure of index maintenance cost.

For the index maintenance cost model, the following additional statistics for each table involved in the query are used. These statistics may be available as database-wide system statistics or be provided by the user. The Frequency of DMLs of different types inserts, updates, deletes, bulk loads on the table; the Frequency of queries involving the table; and the Total numbers of rows processed by inserts, updates, deletes, selects, bulk loads to the table Depending on the DMLs and queries using the given table, determine whether the workload has the characteristics of a Data Warehousing/Decision-support application (mostly reads with infrequent updates) or OLTP application (frequent high volume of updates). This is indicated by two weights, dssweight and oltpweight, each having value between value 0 and 100. The sum of the two should be 100. The weights are computed as follows:

Totaldmls=freq(ins)+freq(upd)+freq(del)

Totalaccesses=Totaldmls+freq(selects)+freq(bulk-loads).

A system is considered as an OLTP system if the ratio R1 of DMLs to total accesses to the table exceeds a threshold, P1 (set to 0.75). The process can assume that R1>P1 is normalized to P1.

$R1 = \text{Min}(P1, \text{Total DMLs(ins+upd+del)/total accesses to table})$

A system is considered as a DSS system if the ratio R2 of rows processed by bulk load to total rows processed by all DMLs exceeds a threshold, P2 (set to 0.75). The process can assume that R2>P2 is normalized to P2.

$R2 = \text{Min}(P2, \text{Rows processed by bulk Load/Total rows updated by all DMLs(ins, upd, del, bulk loads)})$.

The rationale is that in a pure OLTP system, the DML will overpower selects and in a warehouse most updates will use bulk loads.

This can be visually represented as follows:

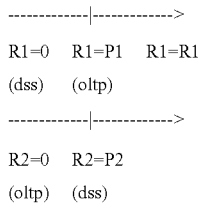

Conceptually the formula determines how far the system is from a pure DSS or a pure OLTP system and accordingly assigns weights as follows:

$\text{dssweight} = 1 - (R1/P1 + (P2-R2)/P2)/2$ $\text{oltpweight} = 1 - (R2/P2 + (P1-R1)/P1)/2$.

Next, normalize these numbers so that their sum=100.

A pure DSS system is one where R1=0 and R2>P2 (no dmls, only bulk loads), A pure OLTP system is one where R1>P1 and R2=0 (mostly dmls, few selects). Any other weights indicate a hybrid system.

These weights will be used to weigh the index maintenance costs, which are modeled different for a warehouse v/s OLTP system. The actual functions for determining costs of index maintenance are not subject of this patent. Suffice it to say that there are different functions for a warehouse v/s OLTP system. If, $IM_1$ and $IM_2$ are the costs of maintenance cost of the index for a pure warehouse and OLTP system respectively, the cost of index maintenance for any system is computed as $(\text{dssweight}*IM_1 + \text{oltpweight}*IM_2)$.

Index Column Eligibility Check

Before any column, C is considered for inclusion into an index, we do the following check to determine if the column is too volatile, i.e. changes too often. The check is not very stringent because the final configuration enumeration phase has the ultimate responsibility to determine which index configuration has the best cost. This simple check is designed to prevent inclusion of extremely volatile columns into an otherwise useful index.

Let I be the index maintenance cost per byte of changed data, of the index with only column C as the key. A column is determined to be too volatile if the index maintenance cost for the above index, exceeds a specified percentage (say 10%) of the improvement in scan cost for the table in queries involving that column.

$S1$ = total cost of all accesses to this table for this column in all querries.

$= \text{freq}(sel) * \text{table scan cost}$ $S2$ = total cost of all accesses to this table using the index.

S2=total cost of all accesses to this table using the index. The process could approximate each access to be the number of levels of the index+1 (assumes all unique accesses). To give the index the best chance, the process can assume that the average # of levels is 1. So S2=2. If I/(S1-S2)>0.1, the column is rejected.

Bitmap Index Check

As mentioned earlier, bitmap index maintenance can have implications on the concurrency of the system. Hence, before recommending any bitmap index on a table, the process may check that the system has a sufficiently low (<5) ratio, R3 of INS+DEL to Total accesses.

$R3 = \text{freq}(ins) + \text{freq}(del)/\text{Total accesses} < 0.05$.

This process is integrated into an RDBMS query optimizer that efficiently determines candidate indexes for a SQL query. One aspect of the algorithm is that it is interspersed with the normal optimization process and therefore can make intelligent use of optimizer heuristics and statistics. The algorithm includes an index merging component that consolidates index candidates for multiple SQL queries under the assumption that the queries are processed in order of importance. The optimizer applies heuristics to favor the merged candidates over newer candidates with bounded degradation of execution plan cost and substantial space savings.

One benefit of having the index tuning algorithm integrated into the optimizer is that the when the indexes are actually implemented they will get used by the queries. Further, information such as selectivity estimates from the optimizer can be used to come up with a succinct list of candidate indexes for the query. Also, the process can limit the analysis of the query for access paths and transformations that the optimizer will actually consider. This algorithm also can use a model for index cost maintenance that prevents inclusion of very volatile columns into an index.

The algorithm can be used as a component in the SQL Access Advisor, which is a tool that generates index and materialized view recommendations for a SQL workload. By providing a tool for an otherwise tedious and complex task, it improves the manageability and ease-of-use of the server. The tool provides recommendations in line with the query optimizer's behavior and hence is a major improvement on previous generation of database management tools.

The process can also be used as a component for another tool known as the SQL Tuning Advisor, which recommends tuning strategies for a single SQL statement by considering statement rewrites, improved estimation of optimizer statistics and index solutions.

According to one embodiment of the invention, computer system 400 performs specific operations by processor 404 executing one or more sequences of one or more instructions contained in system memory 406. Such instructions may be read into system memory 406 from another computer readable medium, such as static storage device 408 or disk drive 410. In alternative embodiments, hard-wired circuitry may be used in place of or in combination with software instructions to implement the invention.

The term "computer readable medium" as used herein refers to any medium that participates in providing instructions to processor 404 for execution. Such a medium may take many forms, including but not limited to, non-volatile media, volatile media, and transmission media. Non-volatile media includes, for example, optical or magnetic disks, such as disk drive 410. Volatile media includes dynamic memory, such as system memory 406. Transmission media includes coaxial cables, copper wire, and fiber optics, including wires that comprise bus 402. Transmission media can also take the form of acoustic or light waves, such as those generated during radio wave and infrared data communications. Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer can read.

In an embodiment of the invention, execution of the sequences of instructions to practice the invention is performed by a single computer system 400. According to other embodiments of the invention, two or more computer systems 400 coupled by communication link 420 (e.g., LAN, PTSN, or wireless network) may perform the sequence of instructions to practice the invention in coordination with one another. Computer system 400 may transmit and receive messages, data, and instructions, including program, i.e., application code, through communication link 420 and communication interface 412. Received program code may be executed by processor 404 as it is received, and/or stored in disk drive 410, or other non-volatile storage for later execution.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than restrictive sense.

We claim:

1. A method comprising:
identifying a set of high load database query language statements from a workload by performing a comparison between performance information for query language statements in the workload, wherein the workload comprises query language statements;
for each statement in the set,
performing an optimization process on the statement;
determining an access structure for an advanced transformation of the statement;
during the optimization process, generating a set of candidate indexes which could be used to improve an execution plan for the statement, wherein the set of candidate indexes comprises index candidates for the access structure;
selecting a subset from the set of candidate indexes based at least in part on a determination of whether an index maintenance cost exceeds a non-zero threshold or not;
identifying an index in the subset that can satisfy a different statement;
consolidating the identified index in the subset with an index for the different statement;
determining an execution plan using a processor for the statement using the subset of indexes; and
storing the execution plan in a medium.

2. The method of claim 1, wherein consolidating comprises: merging indexes to satisfy multiple statements.

3. The method of claim 1, wherein performing the optimization process comprises applying a star transformation, and generating the set of candidate indexes comprises generating candidate indexes for the star transformation.

4. The method of claim 2, wherein merging indexes comprises:
merging indexes based on a user defined priority.

5. The method of claim 1, further comprising: for each candidate index, generating a temporary data structure with statistical metadata and no data.

6. The method of claim 1, wherein each of the database query language statements is a SQL statement.

7. A computer-implemented system comprising:
means for identifying a set of high load database query language statements from a workload by performing a comparison between performance information for query language statements in the workload, wherein the workload comprises query language statements;
means for performing an optimization process on a first statement in the set;
means for determining an access structure for an advanced transformation of the statement;
means for generating, during the optimization process, a set of candidate indexes which could be used to improve an execution plan for the first statement, wherein the set of candidate indexes comprises index candidates for the access structure;
means for selecting a subset from the set of candidate indexes based at least in part on a determination of whether an index maintenance cost exceeds a non-zero threshold or not;
means for identifying an index in the subset that can satisfy a second statement in the set;
means for consolidating the identified index in the subset with an index for the second statement; and
means for determining an execution plan for the first statement using the subset of indexes, wherein the means for determining the execution plan comprises a processor.

8. The system of claim 7, wherein means for consolidating comprises:
means for merging indexes to satisfy multiple statements.

9. The system of claim 7, wherein means for performing the optimization process comprises means for applying a star transformation, and wherein means for generating the set of candidate indexes comprises means for generating candidate indexes for the star transformation.

10. The system of claim 8, wherein means for merging indexes comprises:
means for merging indexes based on a user defined priority.

11. The system of claim 7, further comprising:
means for generating, for each candidate index, a temporary data structure with statistical metadata and no data.

12. The system of claim 7, wherein each of the database query language statements is a SQL statement.

13. A volatile or non-volatile computer readable medium storing a computer program of instructions which, when executed by a processing system, cause the system to perform a method comprising:
identifying a set of high load database query language statements from a workload by performing a comparison between performance information for query language statements in the workload, wherein the workload comprises query language statements;
for each statement in the set,
performing an optimization process on the statement;

determining an access structure for an advanced transformation of the statement;

during the optimization process, generating a set of candidate indexes which could be used to improve an execution plan for the statement, wherein the set of candidate indexes comprises index candidates for the access structure;

selecting a subset from the set of candidate indexes based at least in part on a determination of whether an index maintenance cost exceeds a non-zero threshold or not;

identifying an index in the subset that can satisfy a different statement;

consolidating the identified index in the subset with an index for the different statement; and determining an execution plan for the statement using the subset of indexes.

14. The computer readable medium of claim 13, wherein consolidating comprises:

merging indexes to satisfy multiple statements.

15. The computer readable medium of claim 13, wherein performing the optimization process comprises applying a star transformation, and generating the set of candidate indexes comprises generating candidate indexes for the star transformation.

16. The computer readable medium of claim 14, wherein merging indexes comprises:

merging indexes based on a user defined priority.

17. The computer readable medium of claim 13, wherein the method further comprises:

for each candidate index, generating a temporary data structure with statistical metadata and no data.

18. The computer readable medium of claim 13, wherein each database query language statement is a SQL statement.

19. A method comprising:

identifying a set of high load database query language statements from a workload by performing a comparison between performance information for query language statements in the workload, wherein the workload comprises query language statements;

for each statement in the set, performing an optimization process on the statement;

determining that an access structure for an advanced transformation of the statement is beneficial for the statement during the optimization process;

during the optimization process, generating a set of candidate indexes which could be used to improve an execution plan for the statement, wherein the set of candidate indexes comprises index candidates for the access structure;

selecting a subset from the set of candidate indexes using a model to remove expensive indexes; identifying an index in the subset that can satisfy a different statement;

consolidating the identified index in the subset with an index for the different statement;

determining an execution plan using a processor for the statement using the subset of indexes; and storing the execution plan in a medium.

20. A computer-implemented system comprising:

means for identifying a set of high load database query language statements from a workload by performing a comparison between performance information for query language statements in the workload, wherein the workload comprises query language statements;

means for performing an optimization process on a first statement in the set; means for determining that an access structure for an advanced transformation of the statement is beneficial for the statement during the optimization process; means for generating, during the optimization process, a set of candidate indexes which could be used to improve an execution plan for the first statement, wherein the set of candidate indexes comprises index candidates for the access structure;

means for selecting a subset from the set of candidate indexes using a model to remove expensive indexes;

means for identifying an index in the subset that can satisfy a second statement in the set;

means for consolidating the identified index in the subset with an index for the second statement; and means for determining an execution plan for the first statement using the subset of indexes, wherein the means for determining the execution plan comprises a processor.

21. A volatile or non-volatile computer readable medium storing a computer program of instructions which, when executed by a processing system, cause the system to perform a method comprising:

identifying a set of high load database query language statements from a workload by performing a comparison between performance information for query language statements in the workload, wherein the workload comprises query language statement;

for each statement in the set, performing an optimization of the statement;

determining that an access structure for an advanced transformation of the statement is beneficial for the statement during the optimization process;

during the optimization process, generating a set of candidate indexes which could be used to improve an execution plan for the statement, wherein the set of candidate indexes comprises index candidates for the access structure;

selecting a subset from the set of candidate indexes using a model to remove expensive indexes;

identifying an index in the subset can satisfy a different statement;

consolidating the identified index in the subset with an index for the different statement; and determining an execution plan for the statement using the subset of indexes.

22. the method of claim 1, wherein the index maintenance cost is based on one or more of insert frequency, update frequency, delete frequency, and bulk load frequency.

23. the method of claim 1, wherein the index maintenance cost is based on a cost model that considers how far a system that processes the set of database query language statement is from a pure Decision Support System (DSS) or a pure Online Transaction Processing System (OLTP).

24. The system of claim 7, wherein the index maintenance cost is based on one or more of insert frequency, update frequency, delete frequency, and bulk load frequency.

25. the method of claim 7, wherein the index maintenance cost is based on a cost model that considers how far a system that processes the set of database query language statement is from a pure Decision Support System (DSS) or a pure Online Transaction Processing System (OLTP).

26. The computer readable medium of claim 13, wherein the index maintenance cost is based on one or more of insert frequency, update frequency, delete frequency, and bulk load frequency.

27. The computer readable medium of claim 13, wherein the index maintenance cost is based on a cost model that considers how far a system that processes the set of database query language statement is from a pure Decision Support System (DSS) or a pure Online Transaction Processing System (OLTP).

* * * * *

UNITED STATES PATENT AND TRADEMARK OFFICE
CERTIFICATE OF CORRECTION

PATENT NO.        : 8,825,629 B2
APPLICATION NO.   : 10/936469
DATED             : September 2, 2014
INVENTOR(S)       : Lawande et al.

It is certified that error appears in the above-identified patent and that said Letters Patent is hereby corrected as shown below:

On the Title Page, item [56]

On page 2, column 2, under Other Publications, line 4, delete "Denmark," and insert -- Denmark, 2000, --, therefor.

On page 2, column 2, under Other Publications, line 14, delete "Parellel" and insert -- Parallel --, therefor.

In the Specification

Column 12, line 10, delete "Basecost(Q)" and insert -- BaseCost(Q) --, therefor.

In the Claims

Column 20, line 22, Claim 21, delete "statement;" and insert -- statements; --, therefor.

Column 20, line 24, Claim 21, delete "of" and insert -- process on --, therefor.

Column 20, line 34, Claim 21, delete "subset" and insert -- subset that --, therefor.

Column 20, line 40, Claim 22, delete "the method" and insert -- The method --, therefor.

Column 20, line 43, Claim 23, delete "the method" and insert -- The method --, therefor.

Column 20, line 45, Claim 23, delete "statement" and insert -- statements --, therefor.

Column 20, line 50, Claim 25, delete "the method" and insert -- The system --, therefor.

Column 20, line 62, Claim 27, delete "statement" and insert -- statements --, therefor.

Signed and Sealed this
Twenty-eighth Day of July, 2015

Michelle K. Lee
*Director of the United States Patent and Trademark Office*